(12) United States Patent
Barbat et al.

(10) Patent No.: US 7,284,788 B1
(45) Date of Patent: Oct. 23, 2007

(54) ENERGY-ABSORBING UNDERRUN PROTECTION SYSTEM FOR A VEHICLE

(75) Inventors: Saeed Barbat, Farmington Hills, MI (US); Gregory Frederick, Shelby Township, MI (US); Li Chai, Northville, MI (US); Phillip Przybylo, Williamston, MI (US); Xiaowei Li, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 11/163,300

(22) Filed: Oct. 13, 2005

(51) Int. Cl.
*B06R 19/02* (2006.01)
(52) U.S. Cl. .................. 296/187.09; 293/133
(58) Field of Classification Search ........... 296/187.09; 293/102, 133, 144, 146, 123
See application file for complete search history.

(56) References Cited

U.S. PATENT DOCUMENTS

| | | | |
|---|---|---|---|
| 4,359,239 A | 11/1982 | Eggert, Jr. | |
| 5,507,546 A | 4/1996 | Holley | |
| 5,624,143 A | 4/1997 | Waldschmitt | |
| 5,632,518 A | 5/1997 | Kendall | |
| 6,089,629 A | 7/2000 | Hope et al. | |
| 6,176,529 B1 | 1/2001 | Kitzmiller et al. | |
| 6,176,530 B1 | 1/2001 | Gollungberg | |
| 6,764,118 B2* | 7/2004 | DePottey et al. | 293/118 |
| 6,938,948 B1* | 9/2005 | Cornell et al. | 296/187.09 |
| 7,185,945 B2* | 3/2007 | Dandekar et al. | 296/187.09 |
| 2007/0040414 A1* | 2/2007 | Frederick et al. | 296/187.09 |

* cited by examiner

*Primary Examiner*—Dennis H. Pedder
(74) *Attorney, Agent, or Firm*—Gigette M. Bejin; Dickinson Wright PLLC

(57) ABSTRACT

An energy-absorbing underrun protection system for a vehicle. The energy-absorbing underrun protection system is comprised of a deformable construction adapted for deforming along a longitudinal axis to absorb crash energy. This deformable construction has a torque arm member extending substantially perpendicularly therefrom for receiving an impact load offset from the longitudinal axis and bending the deformable construction toward the impact load.

5 Claims, 5 Drawing Sheets

ENERGY-ABSORBING UNDERRUN PROTECTION SYSTEM FOR A VEHICLE

TECHNICAL FIELD

The present invention relates generally to vehicles, and more particularly to an energy-absorbing underrun protection system for a vehicle.

BACKGROUND

Secondary energy absorbers for vehicles have significantly improved passenger safety in car-to-truck collisions.

One known device is a rigid rear bumper extending downward from a truck bed of a tall profile vehicle, such as a transport truck. This extended bumper typically is utilized for contacting the front bumper or other front-end structure of a shorter profile passenger vehicle. In this way, the extended bumper can minimize or even prevent the shorter vehicle from riding underneath the truck. Accordingly, the extended bumper can prevent the truck bed from immediately impacting the passenger compartment of the shorter vehicle.

A drawback of this bumper is that it typically has a rigid construction that does not deform at sufficiently low loads for enhancing the management of crash energy.

It would therefore be desirable to provide an underrun protection system that improves crash energy management, minimizes intrusion into a shorter profile passenger vehicle, and has a simple and robust construction.

SUMMARY OF THE INVENTION

An energy-absorbing underrun protection system for a vehicle is provided. This protection system is comprised of a deformable construction and a torque arm member extending substantially perpendicularly therefrom. The deformable construction is adapted for deforming along a longitudinal axis to absorb crash energy. The torque arm member is utilized for receiving an impact load offset from the longitudinal axis and bending the deformable construction toward the impact load.

One advantage of the invention is that an energy-absorbing underrun protection system is provided that minimizes vehicle underrun in car-to-truck collisions and improves the safety of vehicle occupants.

Another advantage of one embodiment of the invention is that an energy-absorbing underrun protection system is provided that maintains the management of crash energy by primary energy absorbers during collisions between vehicles of essentially equal height.

Yet another advantage of one embodiment of the invention is that an energy-absorbing underrun protection system is provided that is comprised of few components for minimizing the manufacturing cycle time, as well as the costs associated therewith.

Still another advantage of the invention is that an energy-absorbing underrun protection system is provided that has a substantially efficient construction for use in small packaging constraints, such as a front-end structure of a vehicle.

Yet another advantage of the invention is that an energy-absorbing underrun protection system is provided that is sufficiently lightweight for enhancing the fuel economy of a vehicle having the protection system therein.

Other advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below.

DETAILED DESCRIPTION OF THE INVENTION

Figure 1:
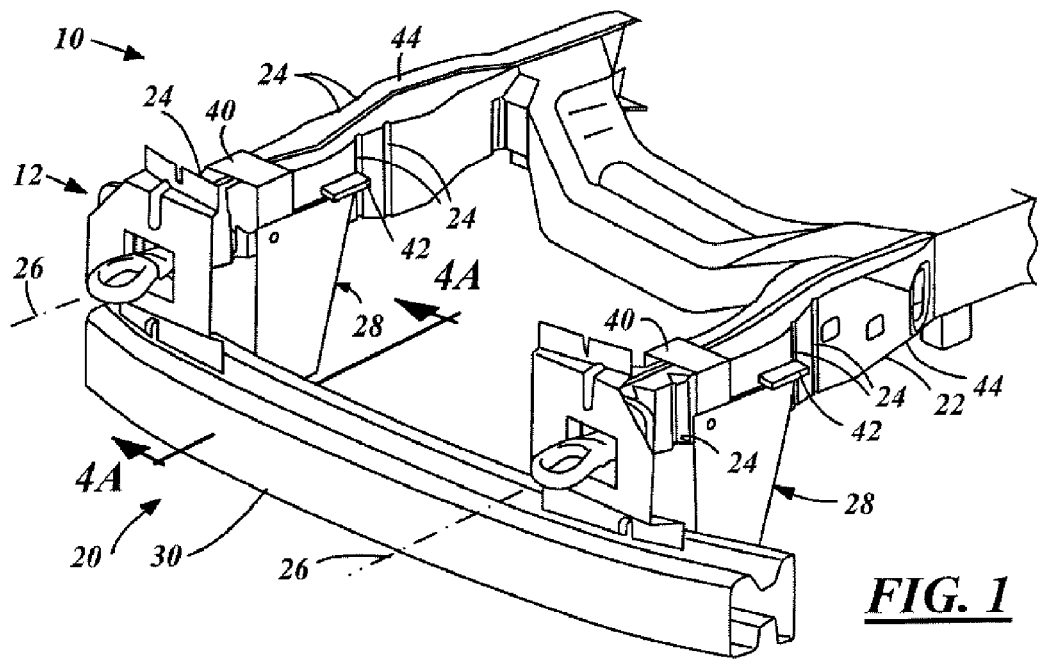
FIG. 1 is a perspective view of a vehicle frame with an energy-absorbing underrun protection system, according to one advantageous embodiment of the claimed invention.

In the following figures, the same reference numerals are used to identify the same components in the various views.

The present invention is particularly suited for an energy-absorbing underrun protection system for a tall profile vehicle, such as a sport utility vehicle ("SUV") or a truck. Accordingly, the embodiments described herein employ features where the context permits. However, various other embodiments are contemplated having different combinations of the described features, having additional features other than those described herein, or even lacking one or more of those features. For instance, it is contemplated that the protection system can be integrated in other portions of the tall profile vehicle, in a shorter profile vehicle, within a roadside barrier, or various other constructions as desired.

Referring to FIG. 1, there is shown a perspective view of a truck frame 10 having an energy-absorbing underrun protection system 12 ("protection system"), according to one advantageous embodiment of the claimed invention.

Figure 2:
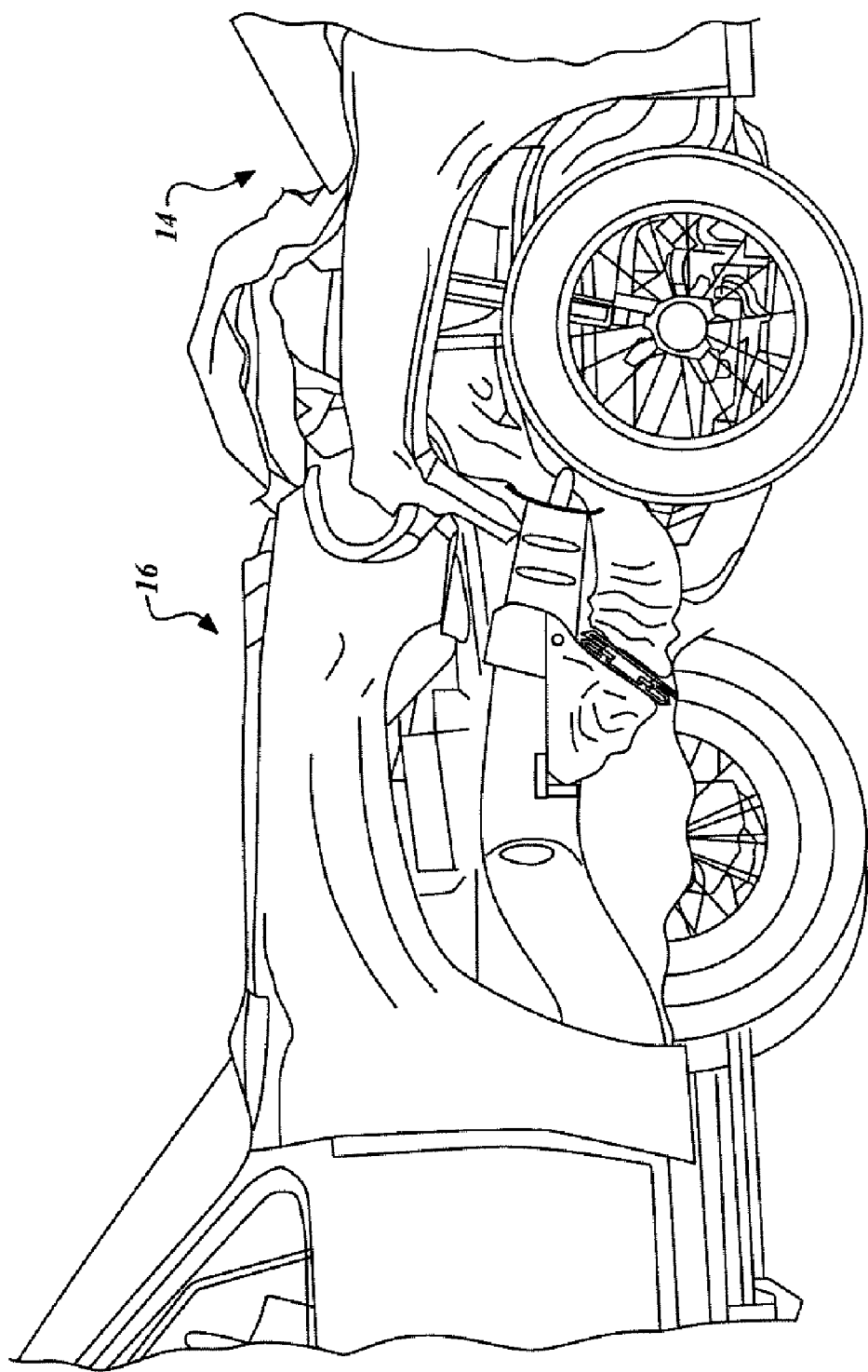
FIG. 2 is a perspective view of a truck having the vehicle frame and the protection system shown in FIG. 1, illustrating the protection system absorbing crash energy from an impact load and preventing vehicle underrun.

As detailed in the embodiments described below and shown in FIG. 2, the protection system 12 is beneficial for absorbing crash energy and blocking a car 14 from submarining or otherwise running underneath a taller profile SUV 16 in an under-riding impact, e.g. a car-to-truck collision.

As also detailed below, the protection system 12 generally includes a deformable construction 18 and a torque arm member 20. The deformable construction 18 is adapted for deforming along a longitudinal axis 26 to absorb crash energy. Further, the torque arm member 20 extends substantially perpendicularly from the deformable construction 18 for receiving an impact load L offset from the longitudinal axis 26 and bending the deformable construction 18 toward the intruding car 14. It will be appreciated that bending the deformable construction 18 absorbs crash energy. Thereafter, in one embodiment, the deformable construction 18 receives the impact load L directly from the car 14 and blocks or minimizes intrusion by the car 14. Alternatively, the deformable construction 18 collapses along its longitudinal axis 26 to absorb additional crash energy. Other examples of the impact load L include a taller profile vehicle, a roadside barrier, or various other intruding members.

Figure 3:
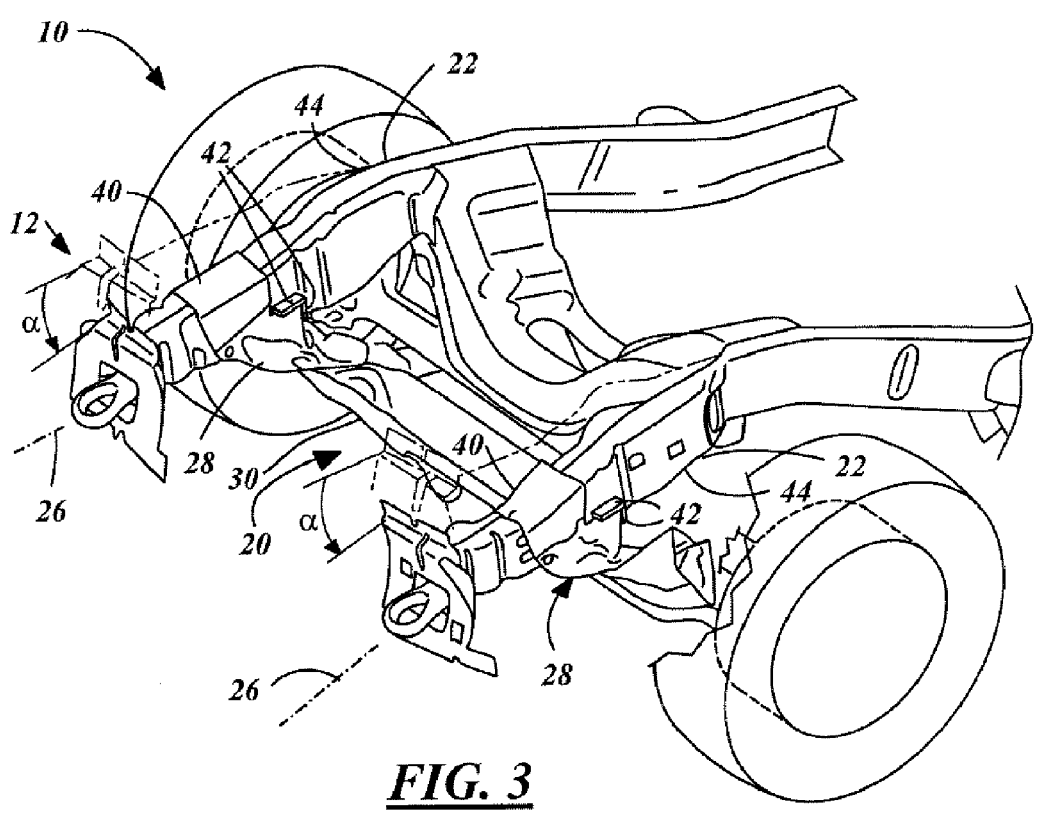
FIG. 3 is a perspective view of the vehicle frame and the protection system shown in FIG. 2.

Referring to FIGS. 1 and 3, the deformable construction 18 is comprised of a pair of energy-absorbing rails 22 for a front-end structure of the truck frame 10. Also, the torque arm member 20 includes a pair of brackets 28 attached to the rails 22 with a blocker beam 30 therebetween.

The rails 22 have wrinkles 24 or other suitable trigger mechanisms therein for progressively folding along the longitudinal axis 26 under a crash load. It will be appreciated that the deformable construction 18 can be comprised of more or less than two (2) rails 22 with or without triggering mechanisms for deforming in a variety of ways or otherwise have other energy-absorbing structures as desired.

Furthermore, two (2) brackets 28 extend substantially perpendicularly from the respective rails 22 and have the blocker beam 30 therebetween for receiving the impact load L in an under-riding impact. In this regard, the blocker beam 30 is positioned for receiving the impact load L at a predetermined distance $D_1$ from the longitudinal axis 26 of the rails 22. Accordingly, the brackets 28 and the blocker beam 30 bend or rotate the rails 22 downwardly toward the intruding car 14.

Figure 4A:
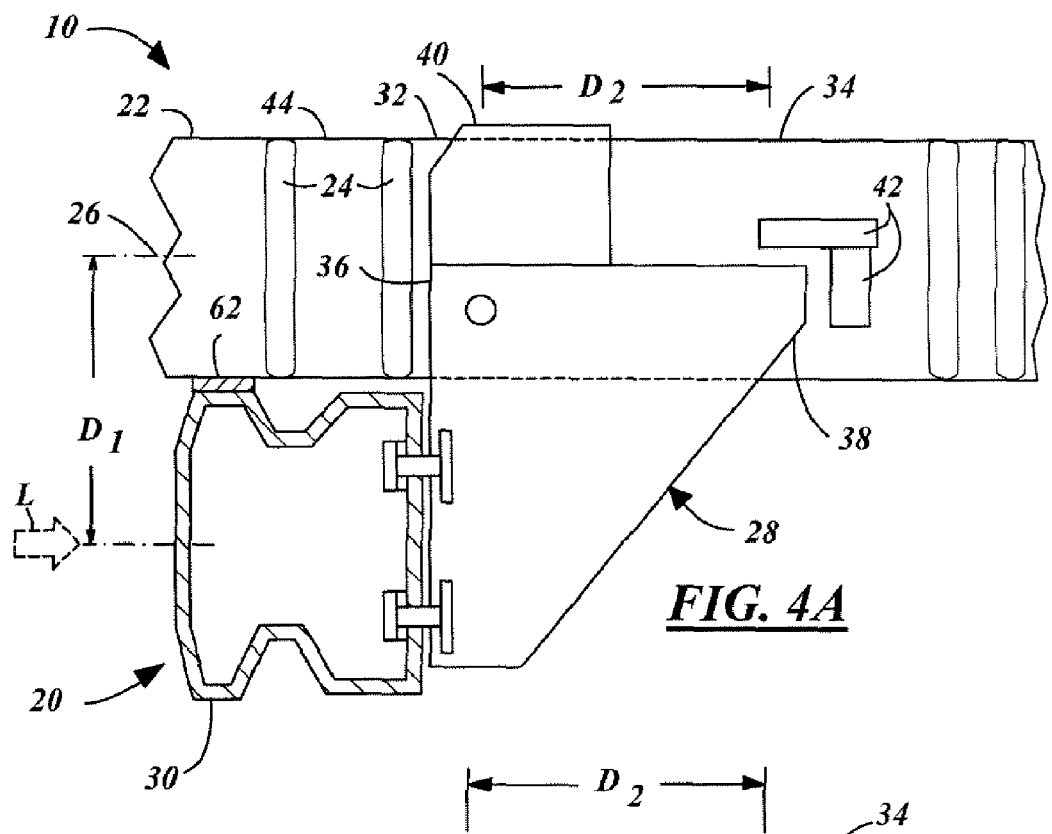
FIG. 4A is a cross-sectional view of the protection system shown in FIG. 1 as taken along line 4A-4A.
Figure 4B:
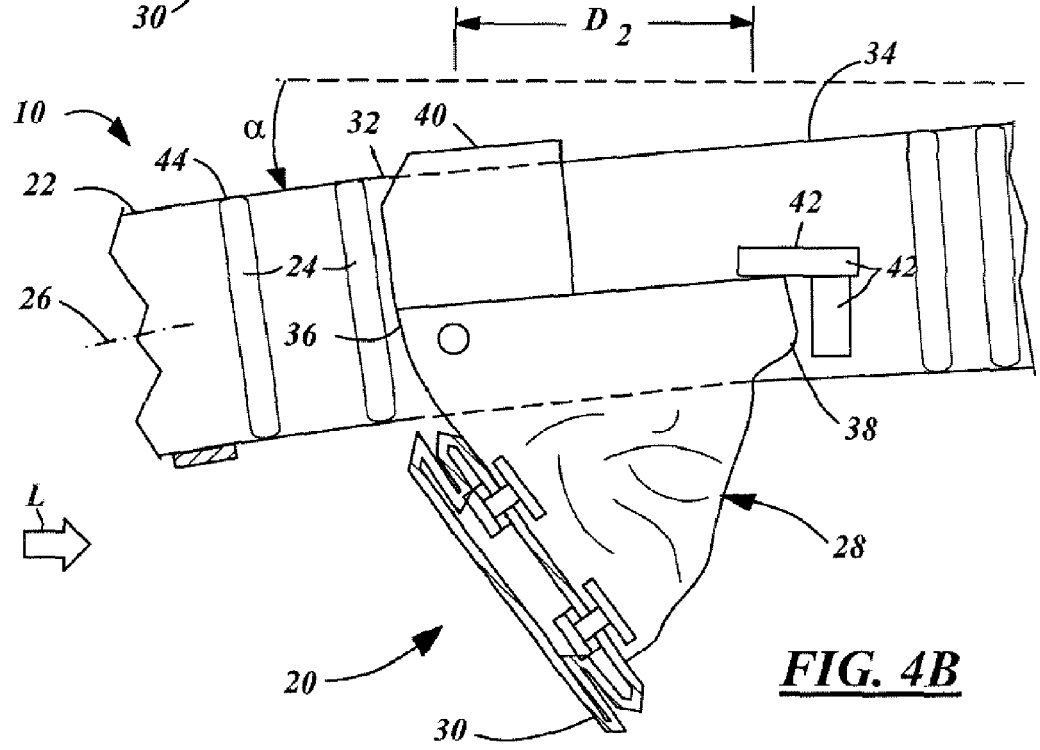
FIG. 4B is a cross-sectional view of the protection system shown in FIG. 3, as taken along line 4A-4A.

As shown in FIGS. 4A and 4B, the blocker beam 30 has a collapsible construction for deforming and absorbing crash energy. However, as exemplified in the embodiments shown in FIGS. 5A, 5B, 6A, and 6B, the blocker beam 30 can instead have a rigid construction.

Each bracket 28 is pivotally attached to its respective rail 22 for bending the rail 22 in an under-riding impact without decreasing energy absorption therein during a direct or level impact, e.g. a truck-to-truck collision.

Figure 7:
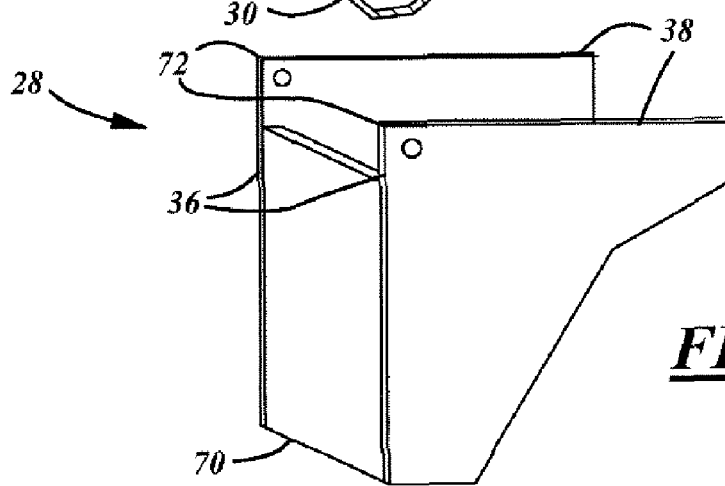
FIG. 7 is a perspective view of one of the brackets shown in FIG. 1.

Specifically, each bracket 28 has an attachment end portion 36, a pivoting end portion 38, and a strap portion 40, which distribute bending forces along a forward portion 32 and a rearward portion 34 of the rail 22. With attention to FIG. 7, there is shown a perspective view of the bracket 28 comprised of a forward plate 70 and two (2) side plates 72 welded or otherwise fastened to opposing sides of the forward plate 70. The forward plate 70 has the blocker beam 30 attached thereto. Also, each side plate 72 has the attachment end portion 36 and the pivoting end portion 38 therein.

The attachment end portion 36 of the bracket 28 is pivotally attached directly to the forward portion 32 of the rail 22. During an under-run impact, the bracket 28 freely rotates rearward until the pivoting end portion 38 is forced against the rearward portion 34 of the rail 22. In this embodiment, the bracket 28 also includes the strap portion 40 for applying a bending force to the forward portion 32 of the rail 22.

In this embodiment, the pivoting end portion 38 is forced against one or more tabs 42 extending from the rail 22 to prevent the bracket 28 from rotating further rearward. However, it will be appreciated that the strap portion 40 and the pivoting end portion 38 can instead be forced against the main body 44 of the rail 22 as desired.

In addition, as shown in FIGS. 4A and 4B, each bracket 28 is attached to its respective rail 22 at only one point along the axis 26 of that rail 22. In that way, the bracket 28 does not reinforce the rail 22 along its longitudinal axis 26. This feature is beneficial for collapsing a rigid truck rail 22 with trigger mechanisms 24 therein and therefore absorbing crash energy. However, it is understood that the bracket 28 can instead reinforce the rail 22 along its length as desired. For instance, with regard to Figures 4A and 4B, the rail 22 can include a second tab for blocking rearward movement of the bracket 28.

Referring now to the alternative embodiments shown in FIGS. 5A, 5B, 6A, and 6B, the torque arm member 20 further includes a collapsible member that is crushable between the bracket 28 and the rail 22 for absorbing crash energy.

Figure 5A:
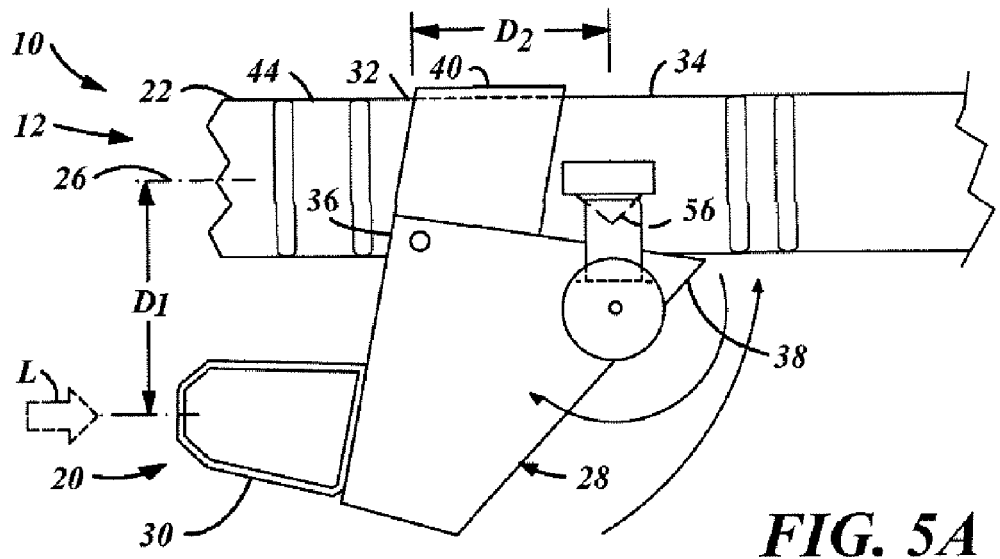
FIGS. 5A and 5B are cross-sectional views of the protection system respectively shown in FIGS. 1 and 3, according to an alternative embodiment of the invention.
Figure 5B:
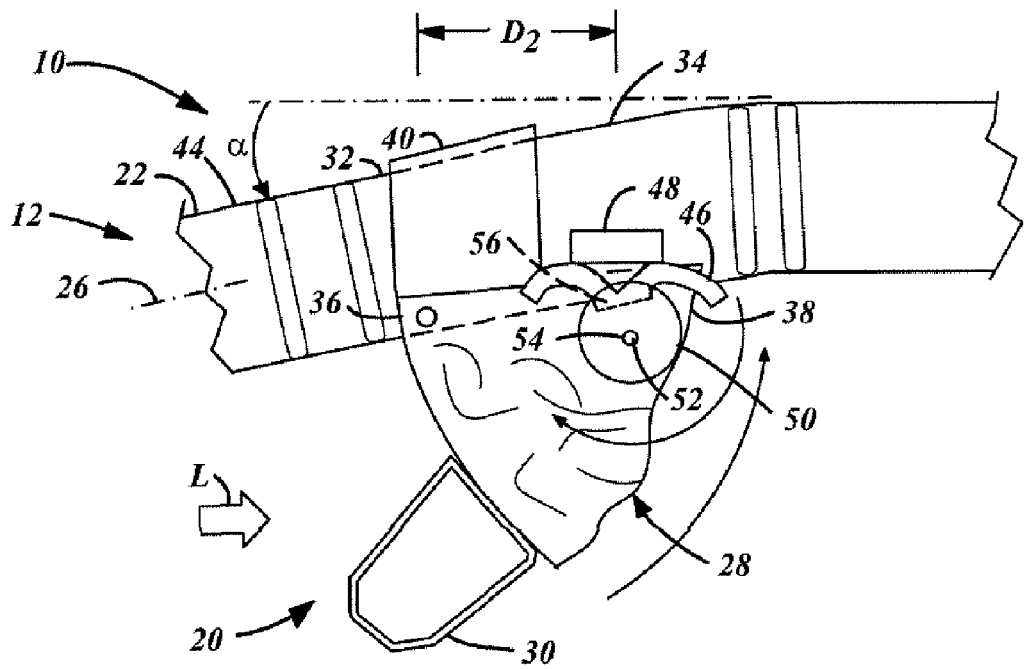

In particular, with attention to the alternative embodiment shown in FIGS. 5A and 5B, the collapsible member is one or more collapsible tubes 46 rotatably mounted to the bracket 28. The collapsible tube 46 is rotatably attached to the pivoting end portion 38 of the bracket 28 for axially crushing the tube 46 against a stop flange 48 extending from the rail 22. It will be appreciated that orthogonal deformation of the collapsible tube 46 absorbs a substantial amount of crash energy. Also, it is contemplated that the tube 46 can instead be crushed directly against the main body 44 of the rail 22 as desired.

In this embodiment, the collapsible tube 46 is rotatably attached to the bracket 28 by a rotatable fixture 50. Namely, the rotatable fixture 50 has a through-hole 52 for receiving a bolt fastener 54 or other suitable spindle member and rotatably attaching the fixture 50 to the pivoting end portion 38 of the bracket 28. Furthermore, the fixture 50 has a recess 56 with the collapsible tube 46 welded or otherwise fixedly mounted therein. However, it is contemplated that the tube 46 can be rotatably attached directly or indirectly to the bracket 28 by a variety of other suitable means.

Also, in this embodiment, the stop flange 48 has an anchoring pin 58 for inserting into an aperture 60 in the collapsible tube 46. This feature is beneficial for positioning the tube 46 in the orthogonal position to efficiently deform against the stop flange 48 and absorb crash energy. This feature also is advantageous for splitting, peeling, or otherwise deforming the collapsible tube 46. However, it is understood that the tube 46 can have various other suitable detent structures as desired.

Figure 6A:
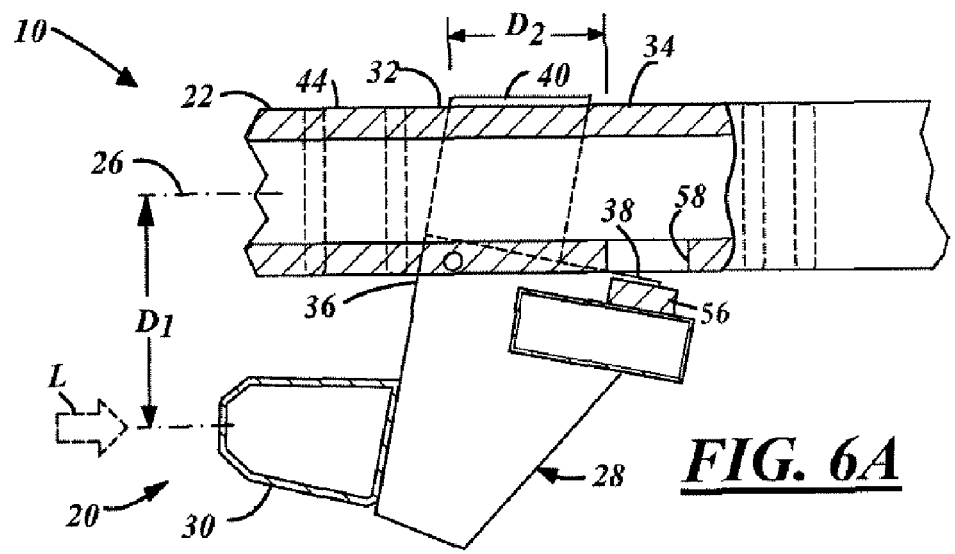
FIGS. 6A and 6B are cross-sectional views of the protection system respectively shown in FIGS. 1 and 3, according to yet another alternative embodiment of the invention.
Figure 6B:
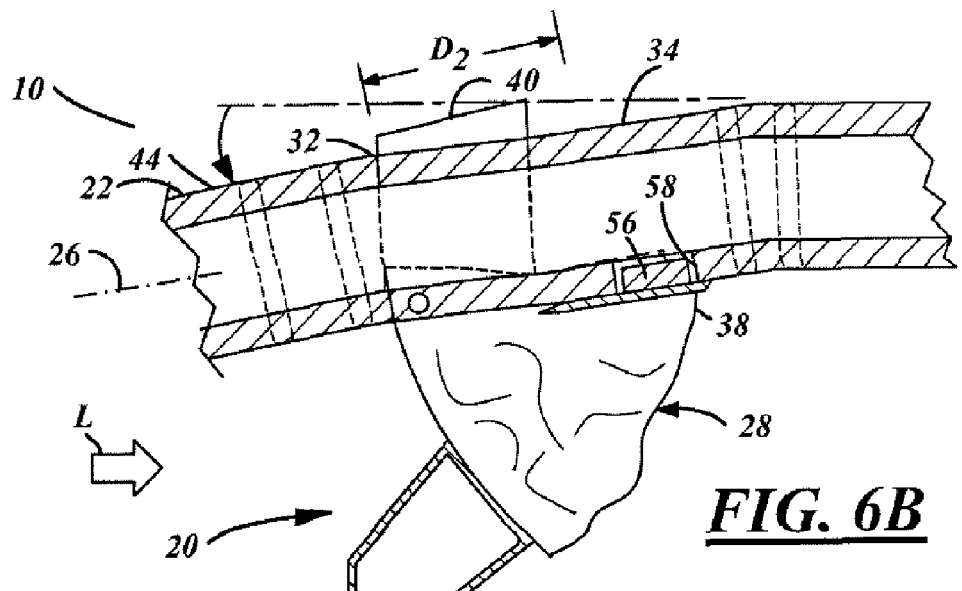

Referring now to the alternative embodiment shown in FIGS. 6A and 6B, the collapsible member is one or more collapsible tubes 46 fixedly attached to the bracket 28. Specifically, the collapsible tube 46 is fixedly attached the pivoting end portion 38 of the bracket 24 for crushing the tube 46 laterally across its width and directly against the rail 22.

Moreover, in this embodiment, the tube 46 has an anchoring pin 58 extending therefrom for inserting into an aperture 60 formed in the rail 22. In this way, the anchoring pin 58 holds the tube 46 in a fixed position on the rail 22 and prevents the tube 46 from sliding rearward along the surface of the rail 22. Accordingly, the anchoring pin 58 facilitates in crushing the tube 46 against the rail 22.

It is contemplated that the collapsible member can be attached directly or indirectly to the bracket 28 or the rail 22 by various suitable fastening means.

Also, in this embodiment, the bracket 28 is comprised of a deformable material for deforming under the impact load L and absorbing crash energy. However, it is understood that the bracket 28 can have a rigid non-deformable structure as desired.

Furthermore, the bracket 28, the collapsible tube 46, and the blocker beam 30 are comprised of aluminum for providing a substantially strong and lightweight construction. However, it is understood that these parts can be comprised of various other suitable materials, any equivalents thereof, and/or any combination thereof.

Referring back to FIGS. 4A and 4B, the bracket 28 and the rail 22 have a cushion member 62 therebetween for minimizing noise, vibration, and harshness levels that would otherwise be produced from between the mating components 18, 24.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. An energy-absorbing underrun protection system for a vehicle, comprising:
    a deformable construction adapted for deforming along a longitudinal axis to absorb crash energy; and
    a torque arm member extending substantially perpendicularly from said deformable construction;
    said torque arm member receiving an impact load offset from said longitudinal axis and bending said deformable construction toward said impact load;
    wherein said deformable construction comprises a pair of vehicle frame rails having a forward portion and a rearward portion with said forward portion having said torque arm member pivotally attached thereto and said rearward portion blocking rotation of said torque arm member, such that said torque arm member is slidable across said rearward portion.

2. The energy-absorbing underrun protection system recited in claim 1 wherein said torque arm member distributes a bending force along said deformable construction.

3. The energy-absorbing underrun protection system recited in claim 1 wherein said torque arm member and said deformable construction have a cushion member therebetween for minimizing at least one of a noise level, a vibration level, and a harshness level.

4. An energy-absorbing underrun protection system for a vehicle, comprising:
    a deformable construction adapted for deforming along a longitudinal axis to absorb crash energy with said deformable construction comprising:
        a pair of rails for a vehicle frame;
        each said rail having a first portion and a second portion offset therefrom along said longitudinal axis;
    a torque arm member extending substantially perpendicularly from said deformable construction, with said torque arm comprising;
    a pair of collapsible brackets for absorbing crash energy, with said brackets pivotally attached to said deformable construction;
    each said bracket having an attachment end portion pivotally attached to said first portion of said rail and a pivoting end portion forced directly against said second portion of said rail for distributing a bending force along said deformable construction and enhancing axial crash energy absorption therein, and with each torque arm member further comprising a strap portion extending from each said bracket for contacting said rail and bending said rail toward said impact load; and
    said torque arm member receiving an impact load offset from said
    longitudinal axis and bending said deformable construction toward said impact load.

5. The energy-absorbing underrun protection system recited in claim 4 wherein said torque arm member further comprises
    at least one of a rigid blocker beam and a collapsible blocker beam extending between said pair of brackets for receiving said impact load.

* * * * *

UNITED STATES PATENT AND TRADEMARK OFFICE
CERTIFICATE OF CORRECTION

PATENT NO. : 7,284,788 B1  Page 1 of 1
APPLICATION NO. : 11/163300
DATED : October 23, 2007
INVENTOR(S) : Saeed Barbat et al.

It is certified that error appears in the above-identified patent and that said Letters Patent is hereby corrected as shown below:

Claim 4, Column 6, Line 11, should read as follows: -- torque arm comprising: --

Claim 5, Column 6, Line 30, should read as follows: -- comprises: --

Signed and Sealed this

Fifteenth Day of April, 2008

JON W. DUDAS
*Director of the United States Patent and Trademark Office*